(12) United States Patent
Chen et al.

(10) Patent No.: US 8,564,545 B2
(45) Date of Patent: Oct. 22, 2013

(54) METHOD FOR CONTROLLING APPLICATION PROGRAM, ELECTRONIC DEVICE THEREOF, AND STORAGE MEDIUM THEREOF

(75) Inventors: Yu-Chuan Chen, Taoyuan County (TW); Hung-I Weng, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 963 days.

(21) Appl. No.: 12/270,865

(22) Filed: Nov. 14, 2008

(65) Prior Publication Data

US 2010/0013774 A1   Jan. 21, 2010

(30) Foreign Application Priority Data

Jul. 18, 2008  (TW) ............................ 97127446 A

(51) Int. Cl.
- *G06F 3/02* (2006.01)
- *G06F 3/041* (2006.01)
- *G06F 3/045* (2006.01)

(52) U.S. Cl.
USPC ........................................ 345/173; 345/174

(58) Field of Classification Search
USPC ................... 345/157, 173–174, 179
See application file for complete search history.

(56) References Cited

U.S. PATENT DOCUMENTS

| | | | |
|---|---|---|---|
| 5,777,605 A * | 7/1998 | Yoshinobu et al. ........... | 345/173 |
| 6,023,265 A | 2/2000 | Lee | |
| 6,340,979 B1 * | 1/2002 | Beaton et al. ................. | 715/764 |
| 6,879,710 B1 * | 4/2005 | Hinoue et al. ................. | 382/124 |
| 7,007,168 B2 * | 2/2006 | Kubo et al. .................... | 713/183 |
| 2003/0079549 A1 | 5/2003 | Lokhorst et al. | |
| 2005/0169527 A1 | 8/2005 | Longe et al. | |
| 2005/0237310 A1 | 10/2005 | Fabritius et al. | |
| 2007/0030256 A1 * | 2/2007 | Akaike et al. ................. | 345/173 |
| 2007/0229477 A1 * | 10/2007 | Ludwig ......................... | 345/173 |
| 2008/0055269 A1 | 3/2008 | Lemay et al. | |
| 2008/0165133 A1 | 7/2008 | Blumenberg et al. | |

FOREIGN PATENT DOCUMENTS

| | | |
|---|---|---|
| EP | 0229713 | 7/1987 |
| FR | 2662528 | 11/1991 |
| TW | 341684 | 10/1998 |
| TW | 200537384 | 11/2005 |

OTHER PUBLICATIONS

"Search Report of Europe Counterpart Application," Issued on Sep. 13, 2010, p. 1-p. 9, in Which the Listed References Were Cited.

(Continued)

*Primary Examiner* — Joseph Feild
*Assistant Examiner* — Andrew Sansinowski
(74) *Attorney, Agent, or Firm* — Jianq Chyun IP Office

(57) ABSTRACT

A method for controlling an application program, an electronic device thereof, and a recording medium thereof are provided. In the present method, when detecting at least one touch area on a touch screen of the electronic device, all touch points contained within each of the touch areas are obtained. Then, a unique typical coordinate value is determined according to a coordinate value of each of the touch points. Finally, an application program is controlled to execute a function relative to the typical coordinate value. Hence, the application program is controlled to execute the corresponding function by detecting the user operation on the touch screen so as to improve a convenience of operating the electronic device.

42 Claims, 3 Drawing Sheets

(56) References Cited

OTHER PUBLICATIONS

"First Office Action of China Counterpart Application", issued on Aug. 4, 2010, p. 1-p. 6, in which the listed references were cited.

"Office Action of Europe Counterpart Application", issued on Dec. 21, 2012, p. 1-p. 9, in which the listed reference was cited.

"Office Action of Taiwan Counterpart Application", issued on Jul. 20, 2012, p. 1-p. 9, in which the listed references were cited.

* cited by examiner

METHOD FOR CONTROLLING APPLICATION PROGRAM, ELECTRONIC DEVICE THEREOF, AND STORAGE MEDIUM THEREOF

CROSS-REFERENCE TO RELATED APPLICATION

This application claims the priority benefit of Taiwan application serial no. 97127446, filed on Jul. 18, 2008. The entirety of the above-mentioned patent application is hereby incorporated by reference herein and made a part of specification.

BACKGROUND OF THE INVENTION

1. Field of the Invention

The present invention relates to a method for controlling an application program of an electronic device. More particularly, the present invention relates to a method for controlling an application program via a touch screen, an electronic device thereof, and a storage medium thereof.

2. Description of Related Art

With development of the touch technique, a touch screen can not only be used as an input interface while displaying images, but also has advantages of low cost and durability, etc., so that it becomes popular in the market. Accordingly, to lighten the consumer electronic products, a plurality of manufacturers utilizes the touch screen to substitute a conventional screen for saving a hardware keyboard space, so as to slim the product or provide a larger display area for disposing a large-sized touch screen. For a user, a larger screen can provide a perfect visual enjoyment, and can facilitate operations thereof. Moreover, slimness of the product can also facilitate the user.

When the touch screen is used as an input interface, a mechanism for judging and responding actions of the user has to be developed. Wherein, a software input panel (SIP) is a technique of inputting characters via the touch screen. When the user operates the conventional hardware keyboard, the consumer electronic product can judge a pressed key according to a signal generated when the key is pressed. However, when the consumer electronic product using the SIP as the input interface is utilized, an extra method for judging which key on the SIP is selected by the user has to be designed. Generally, when the user touches the SIP via a finger, a SIP application program is applied to compare finger-covered areas of the keys, so as to select a key with the most area thereof being covered by the finger as a key desired to be selected by the user. However, based on such a key-selecting mechanism, the selected key is usually not a key desired to be pressed by the user during operating the touch screen according to utilization experiences and investigation results.

Accordingly, considering a product utilization efficiency, it is a main object for the electronic product manufacturers to design an algorithm to quickly and accurately judge the actions of the user, so as to reduce error responses and effectively complete characters input via the touch screen.

SUMMARY OF THE INVENTION

Accordingly, the present invention is directed to a method for controlling an application program, by which a unique typical coordinate value is determined according to all of the touch points detected by a touch screen, so as to control the application program to execute a corresponding function according to the typical coordinate value.

The present invention is directed to a method for controlling a SIP application program by a unique typical coordinate value determined by all of the touch points detected by a touch screen.

The present invention is directed to an electronic device, in which when a user performs operations via a touch screen, a coordinate value representing the operation action of the user is determined, so as to control the application program to execute a function corresponding to the coordinate value.

The present invention provides a method for controlling an application program, which is adapted to an electronic device having a touch screen. The method is described as follows. First, when the touch screen is touched, each of touch areas on the touch screen is detected, and all touch points contained within each of the touch areas are obtained. Next, a unique typical coordinate value is determined according to a coordinate value of each of the touch points. Finally, an application program is controlled to execute a function corresponding to the typical coordinate value.

In an embodiment of the present invention, the coordinate value of each of the touch points includes an x-axis coordinate value and a y-axis coordinate value. The step of determining the typical coordinate value includes following steps. First, a weight value of each of the x-axis coordinate values and a weight value of each of the y-axis coordinate values are respectively defined. Next, an x-axis coordinate weighted average value is calculated according to each of the x-axis coordinate values and the corresponding weight value, and a y-axis coordinate weighted average value is calculated according to each of the y-axis coordinate values and the corresponding weight value. Finally, the x-axis coordinate weighted average value and the y-axis coordinate weighted average value are taken as the typical coordinate value.

In an embodiment of the present invention, the step of respectively defining the weight value of each of the x-axis coordinate value and the weight value of each of the y-axis coordinate value includes obtaining a pressure value of each of the touch points, and determining the weight value of each of the x-axis coordinate values and the weight value of each of the y-axis coordinate values of each of the touch points according to the corresponding pressure value.

In an embodiment of the present invention, the coordinate value of each of the touch points includes an x-axis coordinate value and a y-axis coordinate value. The step of determining the typical coordinate value includes following steps. First, an x-axis coordinate average value of all of the x-axis coordinate values and a y-axis coordinate average value of all of the y-axis coordinate values are respectively calculated. Next, the x-axis coordinate average value and the y-axis coordinate average value are taken as the typical coordinate value.

In an embodiment of the present invention, the application program includes a SIP application program used for displaying a SIP including a plurality of keys on the touch screen.

In an embodiment of the present invention, the step of controlling the application program to execute the corresponding function according to the typical coordinate value includes transmitting the typical coordinate value to the SIP application program. The SIP application program determines a selected key from all of the keys in the SIP according to the typical coordinate value.

In an embodiment of the present invention, the SIP application program enlarges and displays the selected key, wherein the step of enlarging and displaying the selected key includes proportionally enlarging and displaying the selected key.

In an embodiment of the present invention, after the step of determining the selected key, the method further includes displaying an image on the touch screen, wherein the image includes an input prompt information, or the image has a same appearance with that of the selected key.

In an embodiment of the present invention, the step of determining the selected key from all of the keys includes the following steps. First, a keyboard display area of the SIP is obtained, and a key display area of each of the keys is calculated according to the keyboard display area and a key size predetermined value of each of the keys. Next, the key display area containing the typical coordinate value is obtained. Finally, the key corresponding to the key display area is taken as the selected key.

In an embodiment of the present invention, the touch screen includes a resistive touch screen. The electronic device is a personal digital assistant (PDA) mobile phone, a smartphone, a touch phone or a mobile computer.

The present invention provides an electronic device comprising a touch screen, a typical coordinate value determination module and a processing module. The touch screen is used for detecting at least one touch area of the touch screen, and obtaining at least one touch point contained within each of the touch areas. The typical coordinate value determination module is coupled to the touch screen for determining a typical coordinate value according to a coordinate value of each of the touch points. The processing module is coupled to the typical coordinate value determination module for controlling an application program to execute a corresponding function according to the typical coordinate value.

In an embodiment of the present invention, the coordinate value of each of the touch points includes an x-axis coordinate value and a y-axis coordinate value. The typical coordinate value determination module respectively defines a weight value of each of the x-axis coordinate values and a weight value of each of the y-axis coordinate values, and calculates an x-axis coordinate weighted average value according to each of the x-axis coordinate values and the corresponding weight value, and a y-axis coordinate weighted average value according to each of the y-axis coordinate values and the corresponding weight value. Finally, the x-axis coordinate weighted average value and the y-axis coordinate weighted average value are taken as the typical coordinate value.

In an embodiment of the present invention, the typical coordinate value determination module obtains a pressure value of each of the touch points, and defines the weight value of the x-axis coordinate value and the weight value of the y-axis coordinate value of each of the touch points according to the corresponding pressure value.

In an embodiment of the present invention, the coordinate value of each of the touch points includes an x-axis coordinate value and a y-axis coordinate value. The typical coordinate value determination module respectively calculates an x-axis coordinate average value of all of the x-axis coordinate values and a y-axis coordinate average value of all of the y-axis coordinate values, and the x-axis coordinate average value and the y-axis coordinate average value are taken as the typical coordinate value.

In an embodiment of the present invention, the application program includes a SIP application program used for displaying a SIP including a plurality of keys on the touch screen.

In an embodiment of the present invention, the processing module transmits the typical coordinate value to the SIP application program, and the SIP application program determines a selected key from all of the keys according to the typical coordinate value.

In an embodiment of the present invention, the SIP application program displays an image on the touch screen, wherein the image includes an input prompt information, or the image has a same appearance with that of the selected key.

In an embodiment of the present invention, the SIP application program enlarges and displays the selected key, wherein the step of enlarging and displaying the selected key includes proportionally enlarging and displaying the selected key.

In an embodiment of the present invention, the SIP application program obtains a keyboard display area of the SIP, and calculates a key display area of each of the keys according to the keyboard display area and a key size predetermined value of each of the keys. Next, after the key display area containing the typical coordinate value is obtained, the key corresponding to the obtained key display area is taken as the selected key.

In an embodiment of the present invention, the touch screen includes a resistive touch screen. The electronic device is a PDA mobile phone, a smartphone, a touch phone or a mobile computer.

The present invention provides an electronic device including a touch screen and a processing module. The touch screen is used for detecting at least one touch area of the touch screen, and obtaining at least one touch point contained within each of the touch areas. The processing module is coupled to the touch screen for determining a typical coordinate value according to a coordinate value of each of the touch points, and controlling an application program to execute a corresponding function according to the typical coordinate value.

In an embodiment of the present invention, each of the coordinate value includes an x-axis coordinate value and a y-axis coordinate value. The processing module respectively defines a weight value of each of the x-axis coordinate values and a weight value of each of the y-axis coordinate values, and calculates an x-axis coordinate weighted average value according to each of the x-axis coordinate values and the corresponding weight value, and a y-axis coordinate weighted average value according to each of the y-axis coordinate values and the corresponding weight value. Finally, the x-axis coordinate weighted average value and the y-axis coordinate weighted average value are taken as the typical coordinate value.

In an embodiment of the present invention, the processing module obtains a pressure value of each of the touch points, and defines the weight value of the x-axis coordinate value and the weight value of the y-axis coordinate value of each of the touch points according to the corresponding pressure value.

In an embodiment of the present invention, the coordinate value of each of the touch points includes an x-axis coordinate value and a y-axis coordinate value. The processing module respectively calculates an x-axis coordinate average value of all of the x-axis coordinate values and a y-axis coordinate average value of all of the y-axis coordinate values, and the x-axis coordinate average value and the y-axis coordinate average value are taken as the typical coordinate value.

In an embodiment of the present invention, the application program includes a SIP application program used for displaying a SIP including a plurality of keys on the touch screen.

In an embodiment of the present invention, the processing module transmits the typical coordinate value to the SIP application program, and the SIP application program determines a selected key from all of the keys according to the typical coordinate value.

In an embodiment of the present invention, after the selected key is determined, the SIP application program displays an image on the touch screen, wherein the image includes an input prompt information, or the image has a same appearance with that of the selected key.

In an embodiment of the present invention, the SIP application program enlarges and displays the selected key, wherein the step of enlarging and displaying the selected key includes proportionally enlarging and displaying the selected key.

In an embodiment of the present invention, the SIP application program obtains a keyboard display area of the SIP, and calculates a key display area of each of the keys according to the keyboard display area and a key size predetermined value of each of the keys. Next, after the key display area containing the typical coordinate value is obtained, the key corresponding to the obtained key display area is taken as the selected key.

In an embodiment of the present invention, the touch screen includes a resistive touch screen. The electronic device is a PDA mobile phone, a smartphone, a touch phone or a mobile computer.

The present invention provides a storage medium for storing a computer program. The computer program includes a plurality of program codes which can be loaded into an electronic device to execute the aforementioned method for controlling an application program.

The present invention provides a method for controlling a SIP application program used for displaying a SIP comprising a plurality of keys on a touch screen of an electronic device. The method comprising detecting at least one touch area on the touch screen, obtaining at least one touch point contained within each of the touch areas, determining a typical coordinate value according to a coordinate value of each of the touch points, wherein each of the coordinate values comprises an x-axis coordinate value and a y-axis coordinate value, transmitting the typical coordinate value to the SIP application program, and the SIP application program determining a selected key from the keys by obtaining a keyboard display area of the SIP, calculating a key display area of each of the keys according to the keyboard display area and a key size predetermined value of each of the keys, obtaining the key display area containing the typical coordinate value, and taking the key corresponding to the obtained key display area as the selected key. The step of determining the typical coordinate value comprises respectively defining a weight value of each of the x-axis coordinate values and a weight value of each of the y-axis coordinate values wherein any of the x-axis coordinate values or any of the y-axis coordinate values just covers the key display areas in the SIP is defined by a higher weight value than those cover no key display areas, then calculating an x-axis coordinate weighted average value according to each of the x-axis coordinate values and the corresponding weight value, calculating a y-axis coordinate weighted average value according to each of the y-axis coordinate values and the corresponding weight value, and taking the x-axis coordinate weighted average value and the y-axis coordinate weighted average value as the typical coordinate value.

In an embodiment of the present invention, after the selected key is determined, the SIP application program displays an image on the touch screen, wherein the image includes an input prompt information, or the image has a same appearance with that of the selected key.

In an embodiment of the present invention, the SIP application program enlarges and displays the selected key, wherein the step of enlarging and displaying the selected key includes proportionally enlarging and displaying the selected key.

In the present invention, when the user touches the touch screen, all touch points contained within each of the touch areas are detected, and a typical coordinate value representing an action of the user is determined according to the coordination values of the touch points, so as to control the application program to execute a function corresponding to the typical coordinate value. By such means, the user can operate the application program on the electronic device via the touch screen, so that operation convenience of the electronic device is improved.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

To fully convey the concept of the present invention, embodiments are provided below for describing the present invention in detail.

Figure 1:
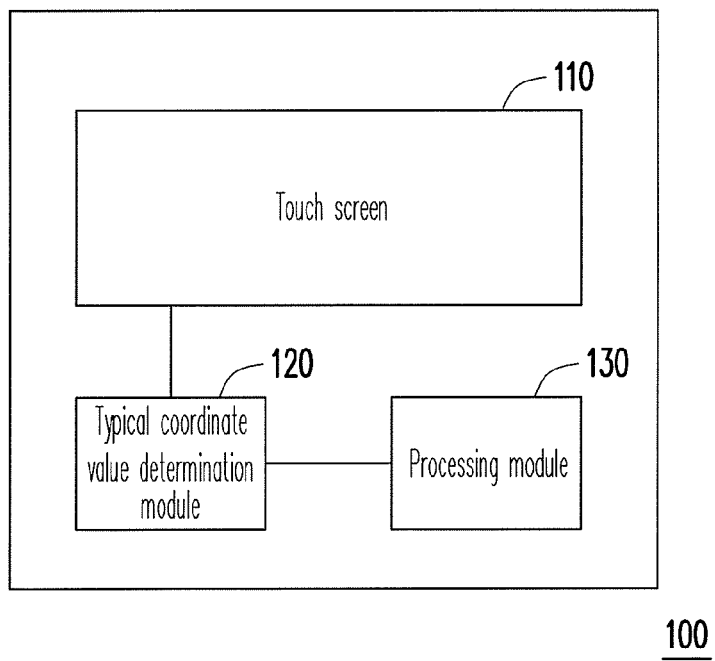
FIG. 1 is a block diagram illustrating an electronic device according to an embodiment of the present invention.

FIG. 1 is a block diagram illustrating an electronic device according to an embodiment of the present invention. Referring to FIG. 1, the electronic device 100 includes a touch screen 110, a typical coordinate value determination module 120 and a processing module 130. In the present embodiment, the electronic device 100 can be a personal digital assistant (PDA) mobile phone, a smartphone, a touch phone or a mobile computer, etc., which is not limited by the present invention.

The touch screen 110 is for example a resistive touch screen, which can be used as a display interface of the electronic device 100, and can further detect each of touch areas formed when an input tool (such as a finger or a stylus) touches the touch screen 110, and obtain all of touch points contained within each of the touch area.

The typical coordinate value determination module 120 is coupled to the touch screen 110 for determining a typical coordinate value according to a coordinate value of each of the touch points after the touch screen 110 obtains all of the touch points. Wherein, the typical coordinate value determination module 120 is for example a controller, or a chip independently disposed in the electronic device 100. It should be noted that regardless of whether the touch screen 110 detects one or more touch areas, the typical coordinate value determination module 120 can only determine a unique typical coordinate value.

The processing module 130 is coupled to the typical coordinate value determination module 120, and controls an application program installed within the electronic device 100 to execute a corresponding function according to the typical coordinate value after the typical coordinate value determination module 120 determines the typical coordinate value.

Figure 2:
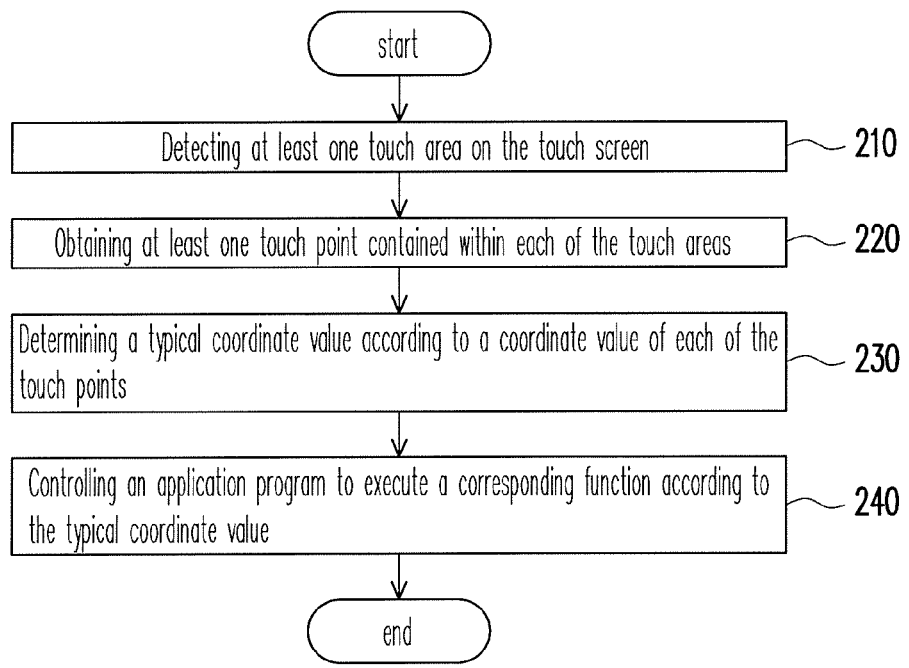
FIG. 2 is a flowchart illustrating a method for controlling an application program according to an embodiment of the present invention.

In the following embodiment, the electronic device 100 is taken as an example to describe steps for controlling the application program via the touch screen 110 in detail. FIG. 2 is a flowchart illustrating a method for controlling an application program according to an embodiment of the present invention. Referring to FIG. 1 and FIG. 2, when the user operates the electronic device 100, the touch screen 100 is touched by the input tool such as the finger or the stylus. Since the input tool has its own width, in step 210, after the input tool touches the touch screen 110, the touch areas generated there between are detected. Wherein, the touch screen 110 can simultaneously detect one or more touch areas. Next, in step 220, the touch screen 110 obtains all of the touch points contained within each of the touch areas.

Next, in step 230, the typical coordinate value determination module 120 determines a typical coordinate value according to a coordinate value of each of the touch points. In an embodiment, the coordinate value of each of the touch points includes two subcomponents of an x-axis coordinate value and a y-axis coordinate value. In the following content, how the typical coordinate value determination module 120 calculates the typical coordinate value according to the coordinate value of each of the touch points is described in detail. After the touch screen 110 obtains all of the touch points of each of the touch areas, the typical coordinate value determination module 120 obtains the x-axis coordinate value of each of the touch points, and calculates an average value of the x-axis coordinate values (referred to as x-axis coordinate average value hereinafter). Similarly, the typical coordinate value determination module 120 also obtains the y-axis coordinate value of each of the touch points, and calculates an average value thereof to obtain a y-axis coordinate average value. After the calculation, the typical coordinate value determination module 120 takes the x-axis coordinate average value and the y-axis coordinate value as the typical coordinate value representing all of the touch points.

In another embodiment, the typical coordinate value determination module 120 first defines weight values for each of the x-axis coordinate values and each of the y-axis coordinate values. Wherein, the method for defining the weight values includes obtaining a pressure value (the pressure value relates to a pressing force exerted to the touch screen 110 by the user) of each of the touch points, and defining the weight values of the x-axis coordinate value and the y-axis coordinate value of each of the touch points according to the corresponding pressure value. For example, the greater the pressure value is, the higher the weight value is. Moreover, the typical coordinate value determination module 120 can also define the weight value according to former utilization experiences of the user. For example, the weight values of the x-axis coordinate values and the y-axis coordinate values that cover the key display areas in the SIP can be defined with higher weight values than those cover no key display areas.

Next, the typical coordinate value determination module 120 calculates an x-axis coordinate weighted average value (for example, respectively calculates a multiplication of each of the x-axis coordinates values and the corresponding weight value, and then calculates an average of the multiplications) according to the x-axis coordinate values and the corresponding weight values, and calculates an y-axis coordinate weighted average value (for example, respectively calculates a multiplication of each of the y-axis coordinates values and the corresponding weight value, and then calculates an average of the multiplications) according to the y-axis coordinate values and the corresponding weight values. Finally, the x-axis coordinate weighted average value and the y-axis coordinate weighted average value are taken as the typical coordinate value for all of the touch points.

According to the above description, the typical coordinate value calculated by the typical coordinate value determination module 120 is a unique and absolute coordinate value. However, it should be noted that the method for calculating the x-axis coordinate average value and the y-axis coordinate average value includes calculating the average value according to a number of the touch points, or calculating a weighted average value according to an experience value, which is not limited by the present invention.

Finally, in step 240, the processing module 130 controls the application program within the electronic device 100 to execute a corresponding function according to the typical coordinate value, so as to complete controlling of the application program via the touch screen 110. It should be noted that the processing module 130 can control any application program that is executed in the electronic device 100 to execute a function according to the typical coordinate value, wherein a type of the application program is not limited by the present invention.

In the aforementioned embodiment, the touch points detected by the touch screen 110 correspond to an operation action of the user, and the typical coordinate value calculated by the typical coordinate value determination module 120 is used for representing the touch points. Therefore, the operation performed to the touch screen 110 by the user can be represented by the typical coordinate value. Accordingly, after the processing module 130 transmits the typical coordinate value to the application program, the function executed by the application program according to the typical coordinate value can represent the operation action of the user.

It should be noted that in another embodiment, the electronic device 100 only includes a touch screen 110 and a processing module 130 coupled to each other. Wherein, the processing module 130 can not only execute the function disclosed as that in the aforementioned embodiment, but can also executes various operations executed by the typical coordinate value determination module 120 in the aforementioned embodiment. Therefore, in the present embodiment, only the processing module 130 is required to determine the typical coordinate value representing all of the touch points, and an extra controller or chip used for implementing functions of the typical coordinate value determination module 120 is not required.

Types of the application program executed in the electronic device 100 are diversified. In the following content, a SIP application program is taken as an example for describing detailed steps of executing the function of the application program according to the typical coordinate value under control of the processing module 130. Wherein, the SIP application program is used for displaying a SIP including a plurality of keys on the touch screen 110.

After the processing module 130 receives the typical coordinate value transmitted by the typical coordinate value determination module 120, the processing module 130 transmits the typical coordinate value to the SIP application program. The SIP application program determines a selected key from all of the keys of the SIP according to the received typical coordinate value.

Figure 3:
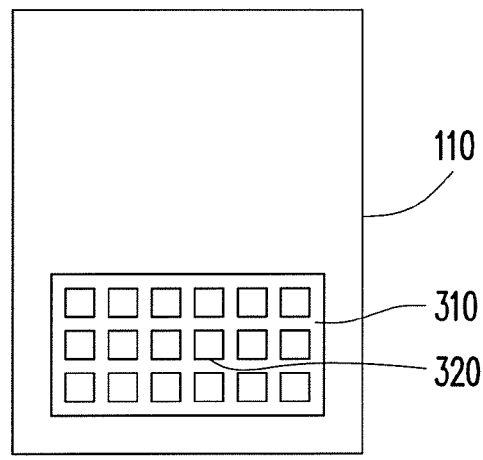
FIG. 3 is a schematic diagram illustrating a touch screen according to an embodiment of the present invention.

FIG. 3 is a schematic diagram illustrating a touch screen according to an embodiment of the present invention. Referring to FIG. 1 and FIG. 3, the SIP application program illustrates a SIP (for example, the SIP 310 of FIG. 3) including a plurality of keys on the touch screen 110 according to a size of the touch screen 110 and a predetermined keyboard display area, and illustrates the plurality of keys according to the type of the SIP 310 and a key size predetermined value. Accordingly, after the SIP application program receives the typical coordinate value, a key display area of each of the keys on the touch screen 110 is first calculated according to the keyboard display area and the key size predetermined value of each of the keys. Then, a key display area containing the typical coordinate value is found from the key display areas, and the key corresponding to such key display area is taken as the selected key. For simplicity's sake, assuming the key display area corresponding to a key 320 contains the typical coordinate value transmitted from the processing module 130, so that the key 320 is regarded as the selected key by the SIP application program.

Figure 4A:
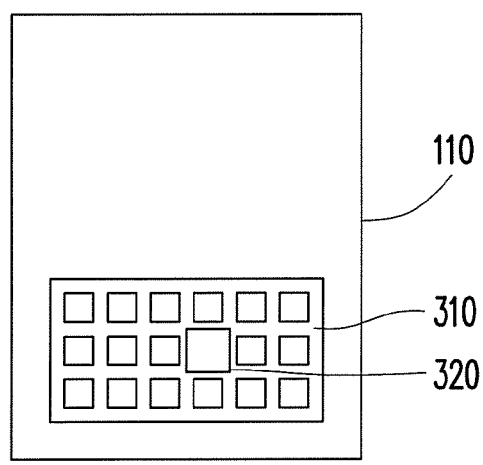
FIGS. 4A and 4B are schematic diagrams illustrating a touch screen according to another embodiment of the present invention.

In an embodiment, after the SIP application program determines the selected key (for example, the key 320), the selected key is enlarged and displayed on the touch screen 110. For example, the SIP application program proportionally enlarges the selected key, and a result thereof is shown as the key 320 of FIG. 4A.

Figure 4B:
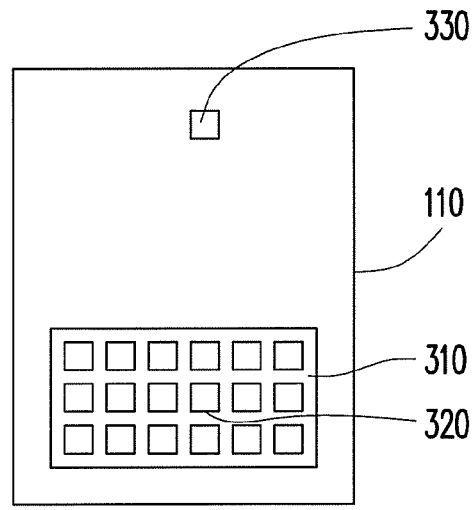

In another embodiment, as shown in FIG. 4B, after the selected key (i.e. the key 320) is determined, the SIP application program displays an image 330 at another region (for example, a top region) of the touch screen 110. Wherein, the image 330 has a same appearance with that of the selected key 320.

In still another embodiment, the image displayed by the SIP application program includes an input prompt information. Wherein, the input prompt information for example alternately displays the characters corresponding to the selected keys, and the character corresponding to the selected key relates to a present input mode of the electronic device 100. The user can know the character to be input when the selected key is released via the input prompt information of the image.

As described above, the SIP application program judges the key selected by the user according to the typical coordinate value, and via various visual feedback effects (for example, enlarging and displaying the selected key, or displaying the image at the other region), the user can easily judge whether the input tool presses a correct position. On the other hand, the visual feedback allows the user to preview a character to be input, so that decreasing of utilization efficiency of the electronic device 100 due to operation errors thereof can be avoided.

Figure 5:
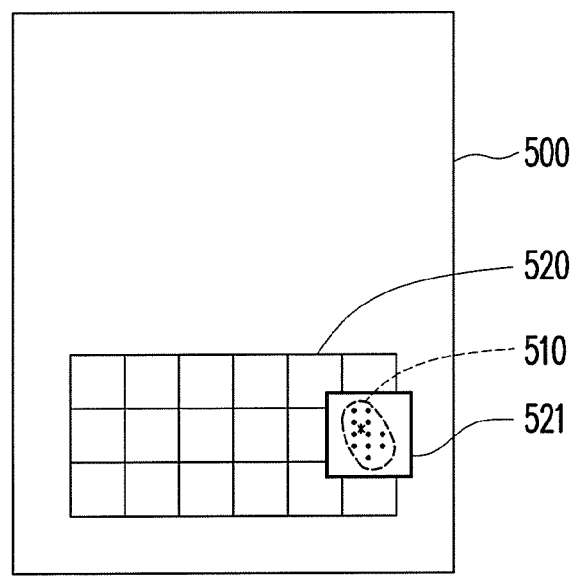
FIG. 5 is a schematic diagram illustrating a pressed touch screen according to an embodiment of the present invention.

According to the user's experiences and investigation results, the unique typical coordinate value obtained by calculating the coordinate values of the touch points is generally the position desired to be pressed by the user when operating the touch screen. Therefore, as shown in FIG. 5, when a touch screen 500 displays a SIP 520, assuming a touch area 510 generated when the user touches the touch screen 500 contains 11 touch points (represented by symbols "•" in FIG. 5), and the typical coordinate value (a position thereof is represented by a symbol "*") obtained according to the coordinate values of the touch points corresponds to the key desired to be pressed by the user (i.e. a key area 521 containing the typical coordinate value). In the present embodiment, the key 521 for example presents a visual feedback effect of being enlarged and displayed at an original position, so as to help the user confirming whether the pressed key is the key desired to be selected. In another embodiment, an image having an appearance similar to that of the key 521 is displayed at the other region (for example, a top region) of the touch screen 500, so that the user can easily confirm whether the correct key is pressed.

The aforementioned embodiment can be applied to any electronic device operated via the touch screen. However, since a touch technique supported by the resistive touch screen is mostly a single-point touch technique, the present invention is especially suitable for the electronic device equipped with the resistive touch screen. According to the characteristic of the resistive touch screen, the operation actions of the user can be simply, quickly and accurately reflected according to the present invention, so that an optimal operation effect can be provided.

It should be noted that the aforementioned method for controlling the application program can be executed in any electronic device having a processor. In other words, the aforementioned embodiment can be designed as a computer program containing a plurality of program codes, and a storage medium (such as a compact disk (CD), a floppy disk or a removable hard disk, etc.) that can be read by the computer is used for storing the computer program. After the computer program is loaded into the electronic device, the aforementioned method for controlling the application program then can be executed in the electronic device.

In summary, according to the method for controlling the application program, the electronic device thereof, and the storage medium thereof, after the touch areas generated during when the input tool touches the touch screen are obtained, the coordinate values of the touch point contained within each of the touch areas are averaged to obtain a unique typical coordinate value. Since the typical coordinate value can be used to represent the operation action of the user, when the application program executes the corresponding function according to the typical coordinate value, operation of the user is suitably reacted. By such means, not only the application program can be simply and accurately controlled, but also operation convenience of the electronic device via the touch screen can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for controlling an application program, adapted to an electronic device having a touch screen, the method comprising:

configuring the touch screen with a predetermined touch area;

detecting from the predetermined area at least one touch area on the touch screen, and after the at least one touch area has been detected;

obtaining a plurality of touch points contained within each of the touch areas;

determining a typical coordinate value according to a coordinate value of each of the touch points, wherein each of the coordinate values comprises an x-axis coordinate value and a y-axis coordinate value, and the step of determining the typical coordinate value comprises:

respectively defining a weight value of each of the x-axis coordinate values and a weight value of each of the y-axis coordinate values and obtaining a pressure value of each of the touch points;

determining the weight value of each of the x-axis coordinate values and the weight value of each of the y-axis coordinate values of each of the touch points according to the corresponding pressure value;

calculating an x-axis coordinate weighted average value by scaling each of the x-axis coordinate values with the corresponding weight value;

calculating a y-axis coordinate weighted average value by scaling each of the y-axis coordinate values with the corresponding weight value; and taking the x-axis coordinate weighted average value and the y-axis coordinate weighted average value as the typical coordinate value; and controlling the application program to execute a corresponding function according to the typical coordinate value.

2. The method for controlling an application program as claimed in claim 1, wherein each of the coordinate values comprises an x-axis coordinate value and a y-axis coordinate value, and the step of determining the typical coordinate value comprises:

respectively calculating an x-axis coordinate average value of the x-axis coordinate values and a y-axis coordinate average value of the y-axis coordinate values; and taking the x-axis coordinate average value and the y-axis coordinate average value as the typical coordinate value.

3. The method for controlling an application program as claimed in claim 1, wherein the application program comprises a software input panel (SIP) application program used for displaying a SIP comprising a plurality of keys on the touch screen, and the step of controlling the application program to execute the corresponding function according to the typical coordinate value comprises:

transmitting the typical coordinate value to the SIP application program; and the SIP application program determining a selected key from the keys according to the typical coordinate value.

4. The method for controlling an application program as claimed in claim 3, wherein after the selected key is determined, the method further comprises:

displaying an image on the touch screen.

5. The method for controlling an application program as claimed in claim 4, wherein the image comprises an input prompt information.

6. The method for controlling an application program as claimed in claim 4, wherein the image has a same appearance with that of the selected key.

7. The method for controlling an application program as claimed in claim 3, wherein after the selected key is determined, the method further comprises:

enlarging and displaying the selected key.

8. The method for controlling an application program as claimed in claim 7, wherein the step of enlarging and displaying the selected key comprises:

proportionally enlarging and displaying the selected key.

9. The method for controlling an application program as claimed in claim 3, wherein the step of determining the selected key from the keys comprises:

obtaining a keyboard display area of the SIP;

calculating a key display area of each of the keys according to the keyboard display area and a key size predetermined value of each of the keys;

obtaining the key display area containing the typical coordinate value; and taking the key corresponding to the obtained key display area as the selected key.

10. An electronic device, comprising:

a touch screen, configured with a predetermined at least one touch area, detecting the predetermined at least one touch area of the touch screen, and after the predetermined at least one touch area has been detected, obtaining a plurality of touch points contained within each of the touch areas;

a typical coordinate value determination module, coupled to the touch screen for determining a typical coordinate value according to a coordinate value of each of the touch points, wherein each of the coordinate values comprises an x-axis coordinate value and a y-axis coordinate value according to a predetermined weight profile for each of the x-axis and y-axis coordinate values, the typical coordinate value determination module respectively defines a weight value of each of the x-axis coordinate values and a weight value of each of the y-axis coordinate values, and calculates an x-axis coordinate weighted average value according to by scaling each of the x-axis coordinate value with the corresponding predetermined weight value, and a y-axis coordinate weighted average value by scaling each of the y-axis coordinate values with the corresponding predetermined weight value, and the x-axis coordinate weighted average value and the y-axis coordinate weighted average value are taken as the typical coordinate value; and a processing module, coupled to the typical coordinate value determination module for controlling an application program to execute a corresponding function according to the typical coordinate value, and the typical coordinate value determination module obtains a pressure value of each of the touch points, and defines the weight value of the x-axis coordinate value and the weight value of the y-axis coordinate value of each of the touch points according to the corresponding pressure value.

11. The electronic device as claimed in claim 10, wherein the touch screen comprises a resistive touch screen.

12. The electronic device as claimed in claim 10, wherein each of the coordinate values comprises an x-axis coordinate value and a y-axis coordinate value, the typical coordinate value determination module respectively calculates an x-axis coordinate average value of the x-axis coordinate values and a y-axis coordinate average value of the y-axis coordinate values, and the x-axis coordinate average value and the y-axis coordinate average value are taken as the typical coordinate value.

13. The electronic device as claimed in claim 10, wherein the application program comprises a SIP application program used for displaying a SIP comprising a plurality of keys on the touch screen, and the processing module transmits the typical coordinate value to the SIP application program, and the SIP application program determines a selected key from the keys according to the typical coordinate value.

14. The electronic device as claimed in claim 13, wherein the SIP application program displays an image on the touch screen.

15. The electronic device as claimed in claim 14, wherein the image comprises an input prompt information.

16. The electronic device as claimed in claim 14, wherein the image has a same appearance with that of the selected key.

17. The electronic device as claimed in claim 13, wherein the SIP application program enlarges and displays the selected key.

18. The electronic device as claimed in claim 17, wherein the SIP application program proportionally enlarges and displays the selected key.

19. The electronic device as claimed in claim 13, wherein the SIP application program obtains a keyboard display area of the SIP, and calculates a key display area of each of the keys according to the keyboard display area and a key size predetermined value of each of the keys, and obtains the key display area containing the typical coordinate value, and the key corresponding to the obtained key display area is taken as the selected key.

20. An electronic device, comprising:
a touch screen, configured with a predetermined at least one touch area, detecting the predetermined at least one touch area of the touch screen, and after the predetermined at least one touch area has been detected, obtaining a plurality of touch points contained within each of the touch areas; and
a processing module, coupled to the touch screen for determining a typical coordinate value according to a coordinate value of each of the touch points, and controlling an application program to execute a corresponding function according to the typical coordinate value, wherein each of the coordinate values comprises an x-axis coordinate value and a y-axis coordinate value, the processing module respectively defines a weight value of each of the x-axis coordinate values and a weight value of each of the y-axis coordinate values according to a predetermined weight profile for each of the x-axis and y-axis coordinate values, and calculates an x-axis coordinate weighted average value according to by scaling each of the x-axis coordinate values with the corresponding predetermined weight value, and a y-axis coordinate weighted average value by scaling each of the y-axis coordinate values with the corresponding predetermined weight value, and the x-axis coordinate weighted average value and the y-axis coordinate weighted average value are taken as the typical coordinate value, and the processing module also obtains a pressure value of each of the touch points, and defines the weight value of the x-axis coordinate value and the weight value of the y-axis coordinate value of each of the touch points according to the corresponding pressure value.

21. The electronic device as claimed in claim 20, wherein the touch screen comprises a resistive touch screen.

22. The electronic device as claimed in claim 20, wherein each of the coordinate value comprises an x-axis coordinate value and a y-axis coordinate value, the processing module respectively calculates an x-axis coordinate average value of the x-axis coordinate values and a y-axis coordinate average value of the y-axis coordinate values, and the x-axis coordinate average value and the y-axis coordinate average value are taken as the typical coordinate value.

23. The electronic device as claimed in claim 20, wherein the application program comprises a SIP application program used for displaying a SIP comprising a plurality of keys on the touch screen, and the processing module transmits the typical coordinate value to the SIP application program, and the SIP application program determines a selected key from the keys according to the typical coordinate value.

24. The electronic device as claimed in claim 23, wherein the SIP application program displays an image on the touch screen.

25. The electronic device as claimed in claim 24, wherein the image comprises an input prompt information.

26. The electronic device as claimed in claim 25, wherein the image has a same appearance with that of the selected key.

27. The electronic device as claimed in claim 23, wherein the SIP application program enlarges and displays the selected key.

28. The electronic device as claimed in claim 27, wherein the SIP application program proportionally enlarges and displays the selected key.

29. The electronic device as claimed in claim 23, wherein the SIP application program obtains a keyboard display area of the SIP, and calculates a key display area of each of the keys according to the keyboard display area and a key size predetermined value of each of the keys, and obtains the key display area containing the typical coordinate value, and the key corresponding to the obtained key display area is taken as the selected key.

30. A non-transitory storage medium, for storing a computer program, wherein the computer program includes a plurality of program codes that can be loaded into an electronic device to execute a method for controlling an application program, and the method comprises:
configuring the touch screen with a predetermined touch area;
detecting from the predetermined area at least one touch area on a touch screen of the electronic device, and after the at least one touch area has been detected;
obtaining a plurality of touch points contained within each of the touch areas;
determining a typical coordinate value according to a coordinate value of each of the touch points; and
controlling an application program to execute a corresponding function according to the typical coordinate value,
wherein each of the coordinate values comprises an x-axis coordinate value and a y-axis coordinate value, and the step of determining the typical coordinate value comprises defining a weight value of each of the x-axis coordinate values and a weight value of each of the y-axis coordinate values respectively according to a predetermined weight profile for each of the x-axis and y-axis coordinate values by obtaining a pressure value of each of the touch points and determining the weight value of each of the x-axis coordinate values and the weight value of each of the y-axis coordinate values of each of the touch points according to the corresponding pressure value, calculating an x-axis coordinate weighted average value by scaling each of the x-axis coordinate values with the corresponding predetermined weight value; calculating a y-axis coordinate weighted average value by scaling each of the y-axis coordinate values with the corresponding predetermined weight value; and taking the x-axis coordinate weighted average value and the y-axis coordinate weighted average value as the typical coordinate value,
wherein the application program comprises a SIP application program used for displaying a SIP comprising a plurality of keys on the touch screen, and the step of controlling the application program to execute the corresponding function according to the typical coordinate value comprises transmitting the typical coordinate value to the SIP application program, and the SIP application program determining a selected key from the keys according to the typical coordinate value.

31. The storage medium as claimed in claim 30, wherein the touch screen comprises a resistive touch screen.

32. The storage medium as claimed in claim 30, wherein after the selected key is determined, the method further comprises:
displaying an image on the touch screen.

33. The storage medium as claimed in claim 30, wherein the image comprises an input prompt information, and the image has a same appearance with that of the selected key.

34. The storage medium as claimed in claim 30, wherein after the selected key is determined, the method further comprises:
   enlarging and displaying the selected key.

35. The storage medium as claimed in claim 34, wherein the step of enlarging and displaying the selected key comprises:
   proportionally enlarging and displaying the selected key.

36. The storage medium as claimed in claim 30, wherein the step of determining the selected key from the keys comprises:
   obtaining a keyboard display area of the SIP;
   calculating a key display area of each of the keys according to the keyboard display area and a key size predetermined value of each of the keys;
   obtaining the key display area containing the typical coordinate value; and
   taking the key corresponding to the obtained key display area as the selected key.

37. A method for controlling a SIP application program used for displaying a SIP comprising a plurality of keys on a touch screen of an electronic device, the method comprising:
   configuring the touch screen with a predetermined touch area;
   detecting from the predetermined area at least one touch area on the touch screen, and after the at least one touch area has been detected;
   obtaining a plurality of touch points contained within each of the touch areas;
   determining a typical coordinate value according to a coordinate value of each of the touch points, wherein each of the coordinate values comprises an x-axis coordinate value and a y-axis coordinate value;
   transmitting the typical coordinate value to the SIP application program; and
   the SIP application program determining a selected key from the keys by obtaining a keyboard display area of the SIP, calculating a key display area of each of the keys according to the keyboard display area and a key size predetermined value of each of the keys, obtaining the key display area containing the typical coordinate value, and taking the key corresponding to the obtained key display area as the selected key, and
   wherein the step of determining the typical coordinate value comprises respectively defining a weight value of each of the x-axis coordinate values and a weight value of each of the y-axis coordinate values according to a predetermined weight profile for each of the x-axis and y-axis coordinate values by obtaining a pressure value of each of the touch points and determining the weight value of each of the x-axis coordinate values and the weight value of each of the y-axis coordinate values of each of the touch points according to the corresponding pressure value wherein any of the x-axis coordinate values or any of the y-axis coordinate values just covers the key display areas in the SIP is defined by a higher weight value than those cover no key display areas, then calculating an x-axis coordinate weighted average value by scaling each of the x-axis coordinate values with the corresponding weight value, calculating a y-axis coordinate weighted average value by scaling each of the y-axis coordinate values with the corresponding weight value, and taking the x-axis coordinate weighted average value and the y-axis coordinate weighted average value as the typical coordinate value.

38. The method for controlling a SIP application program as claimed in claim 37, wherein after the selected key is determined, the method further comprises:
   displaying an image on the touch screen.

39. The method for controlling a SIP application program as claimed in claim 38, wherein the image comprises an input prompt information.

40. The method for controlling a SIP application program as claimed in claim 38, wherein the image has a same appearance with that of the selected key.

41. The method for controlling a SIP application program as claimed in claim 37, wherein after the selected key is determined, the method further comprises:
   enlarging and displaying the selected key.

42. The method for controlling a SIP application program as claimed in claim 41, wherein the step of enlarging and displaying the selected key comprises:
   proportionally enlarging and displaying the selected key.

* * * * *